United States Patent
Kim et al.

(10) Patent No.: US 9,491,659 B2
(45) Date of Patent: Nov. 8, 2016

(54) METHOD AND APPARATUS FOR CONTROLLING NETWORK ACCESS IN A WIRELESS COMMUNICATION SYSTEM

(71) Applicant: LG ELECTRONICS INC., Seoul (KR)

(72) Inventors: Sanggook Kim, Anyang-si (KR); Li-Hsiang Sun, San Diego, CA (US)

(73) Assignee: LG ELECTRONICS INC., Seoul (KR)

( * ) Notice: Subject to any disclaimer, the term of this patent is extended or adjusted under 35 U.S.C. 154(b) by 79 days.

(21) Appl. No.: 14/382,721

(22) PCT Filed: Mar. 21, 2013

(86) PCT No.: PCT/KR2013/002353
§ 371 (c)(1),
(2) Date: Sep. 3, 2014

(87) PCT Pub. No.: WO2013/141628
PCT Pub. Date: Sep. 26, 2013

(65) Prior Publication Data
US 2015/0023166 A1   Jan. 22, 2015

Related U.S. Application Data

(60) Provisional application No. 61/613,901, filed on Mar. 21, 2012.

(51) Int. Cl.
*H04W 28/02* (2009.01)
*H04W 74/00* (2009.01)
*H04W 4/00* (2009.01)

(52) U.S. Cl.
CPC ......... *H04W 28/0289* (2013.01); *H04W 4/005* (2013.01); *H04W 74/006* (2013.01)

(58) Field of Classification Search
None
See application file for complete search history.

(56) References Cited

U.S. PATENT DOCUMENTS

2004/0259528 A1* 12/2004 Gandhi .............. H04W 48/06
455/411

FOREIGN PATENT DOCUMENTS

EP   1317151   6/2003
EP   1677563   7/2006
(Continued)

OTHER PUBLICATIONS

3GPP, Common test environments for User Equipment (UE) conformance testing (Release 10), Mar. 11, 2012, 3GPP TS 36.508 V10.0.0, pp. 81-82.*
PCT International Application No. PCT/KR2013/002353, Written Opinion of the International Searching Authority dated Jul. 25, 2013, 1 page.

*Primary Examiner* — Charles C Jiang
*Assistant Examiner* — George Atkins, Jr.
(74) *Attorney, Agent, or Firm* — Lee Hong Degerman Kang & Waimey; Jonathan Kang; Jeffrey Lotspeich

(57) ABSTRACT

The present invention is directed to a wireless communication system. Specifically, the present invention is directed to a method of controlling network access and an apparatus therefore, wherein the method comprises: receiving a message related with access parameters, the message including a first N-bit field, a second N-bit field and a third 1-bit field, wherein the first N-bit field indicates a maximum number of slots the wireless device is to delay due to random back-off between consecutive access probes, the second N-bit field indicates a maximum number of slots the wireless device is to delay due to random back-off between successive enhanced access probe sequences, and the third 1-bit field for indicating a network congestion situation.

2 Claims, 7 Drawing Sheets

(56) References Cited

FOREIGN PATENT DOCUMENTS

| EP | 2352341 | 8/2011 |
| EP | 2416604 | 2/2012 |
| WO | WO-03/017621 A1 * | 2/2003 | ............ H04L 29/06 |
| WO | 2010/144484 | 12/2010 |

* cited by examiner

METHOD AND APPARATUS FOR CONTROLLING NETWORK ACCESS IN A WIRELESS COMMUNICATION SYSTEM

CROSS-REFERENCE TO RELATED APPLICATIONS

This application is the National Stage filing under 35 U.S.C. 371 of International Application No. PCT/KR2013/002353, filed on Mar. 21, 2013, which claims the benefit of U.S. Provisional Application Ser. No. 61/613,901, filed on Mar. 21, 2012, the contents of which are all hereby incorporated by reference herein in their entirety.

TECHNICAL FIELD

The present invention is directed to a method and an apparatus for being used in a wireless communication system. Specifically, the present invention is directed to a method and an apparatus of controlling network access. The wireless communication system can provide Machine-to-Machine (M2M) services.

BACKGROUND ART

Generally, a wireless communication system is being developed to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). The multiple access system may include one of a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system and any combination thereof.

Machine to Machine (M2M) communications involve the communication (using wired or wireless means, or a combination of both) between two machines without human intervention. The term "M2M communication" is also referred to as "Machine Type Communication (MTC)", or Device-to-Device (D2D) communication in certain literature. However, for consistency, only the term "M2M communication" is used herein. Some examples of M2M communications are: smart metering (e.g., remote reading of a utility meter), healthcare monitoring (e.g., remote monitoring of a patient's heart rate), agricultural monitoring (e.g., monitoring of a crop condition), fleet management tracking (e.g., monitoring current status of trucks on the road), security surveillance (e.g., automatic, real-time monitoring of a building or complex), billing transactions, inventory management (e.g., through monitoring of Point of Sale (POS) transactions in a supermarket) and the like. M2M communications typically use M2M communications-capable sensors or diagnostic devices (which may perform the metering, monitoring, etc., mentioned earlier) on one end and an M2M user device or receiver on the other end to receive data from the sensor devices and process the data.

DISCLOSURE

Technical Problem

An object of the present invention is to provide a method and an apparatus of efficiently resolving network access congestion in a wireless communication system. Another object of the present invention is to provide a method and an apparatus of efficiently controlling network access, particularly random access procedure for the network access. The wireless communication system can provide M2M services, and the network congestion/access may be for the M2M services.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

As an aspect of the invention, a method of controlling network access at a wireless device in a wireless communication system is provided. The method comprises: receiving a message related with access parameters, the message including a first N-bit field, a second N-bit field and a third 1-bit field, wherein the first N-bit field indicates a maximum number of slots the wireless device is to delay due to random back-off between consecutive access probes, the second N-bit field indicates a maximum number of slots the wireless device is to delay due to random back-off between successive access probe sequences, and the third 1-bit field for indicating a network congestion situation, wherein if the third 1-bit field is set to a value corresponding to non-network congestion, a random access (RA) procedure for network access is performed using values of the first N-bit field and the second N-bit field, wherein if the third 1-bit field is set to a value corresponding to network congestion, a fourth M1-bit field for congestion control is further included in the message, and the RA procedure for network access is performed using values of the first N-bit field, the second N-bit field and the fourth M1-bit field.

As another aspect of the invention, a wireless device for being used in a wireless communication system is provided. The wireless device comprises: a radio frequency unit; and a processor, wherein the processor is configured to: receive a message related with access parameters, the message including a first N-bit field, a second N-bit field and a third 1-bit field, wherein the first N-bit field indicates a maximum number of slots the wireless device is to delay due to random back-off between consecutive access probes, the second N-bit field indicates a maximum number of slots the wireless device is to delay due to random back-off between successive access probe sequences, and the third 1-bit field for indicating a network congestion situation, wherein if the third 1-bit field is set to a value corresponding to non-network congestion, a random access (RA) procedure for network access is performed using values of the first N-bit field and the second N-bit field, wherein if the third 1-bit field is set to a value corresponding to network congestion, a fourth M1-bit fields for congestion control is further included in the message, and the RA procedure for network access is performed using values of the first N-bit field, the second N-bit field and the fourth M1-bit field.

Preferably, if the third 1-bit field is set to a value corresponding to non-network congestion, the fourth M1-bit field may be omitted in the message.

Preferably, N is an integer, and M1 may be an integer different from N.

Preferably, M1 may be larger than N.

Preferably, N may be 4 and M1 may be 5.

Preferably, if the third 1-bit field is set to a value corresponding to network congestion, a fifth M2-bit field for congestion control may be further included in the message, wherein the fourth M1-bit field indicates a maximum number of slots the wireless device is to delay due to random back-off between consecutive access probes, and the fifth M2-bit field indicates a maximum number of slots the wireless device is to delay due to random back-off between successive access probe sequences, wherein N is an integer, M1 is an integer larger than N, and M2 is an integer larger than N.

Preferably, N may be 4, M1 may be 5, and M2 may be 5.

Advantageous Effects

Exemplary embodiments of the present invention have the following effects. In accordance with the embodiments of the present invention, network access congestion can be efficiently resolved in a wireless communication system. In addition, network access, particularly random access procedure for the network access can be efficiently controlled.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

MODE FOR INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. 3rd Generation Partnership Project 2 (3GPP2) is developing CDMA2000-based technologies including CDMA2000 1×, 1×EV-DO (1× Evolution—Data Optimized, a.k.a HRPD (High Rate Packet Data), xHRPD (eXtended-cell High Rate Packet Data), the set of 3G standards based on the earlier cdmaOne 2G CDMA technologies. TDMA can be implemented by wireless communication technologies, for example, Global System for Mobile communications (GSM), General Packet Radio Service (GPRS), Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of the Universal Mobile Telecommunications System (UMTS). 3rd Generation Partnership Project (3GPP) Long Term Evolution (LTE) is a part of Evolved UMTS (E-UMTS) that uses E-UTRA. The LTE-Advanced (LTE-A) is an evolved version of 3GPP LTE.

Although the following embodiments of the present invention will hereinafter describe inventive technical characteristics on the basis of the 3GPP2 system, it should be noted that the following embodiments will be disclosed only for illustrative purposes and the scope and spirit of the present invention are not limited thereto. Specific terms used for the exemplary embodiments of the present invention are provided to aid in understanding of the present invention. These specific terms may be replaced with other terms within the scope and spirit of the present invention.

Figure 1:
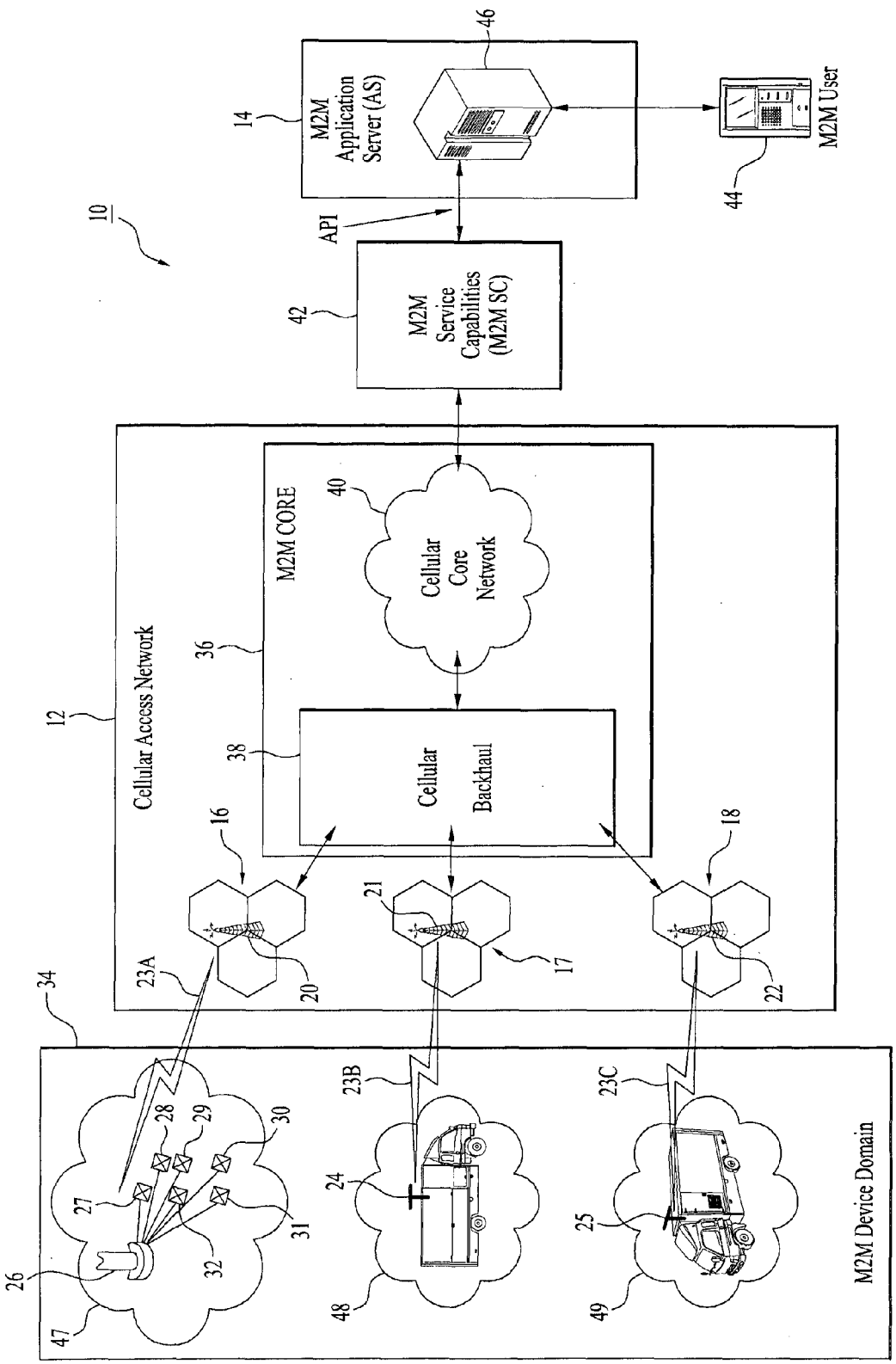
FIG. 1 illustrates an exemplary Machine-to-Machine (M2M) service architecture using a cellular Access Network (AN).

FIG. 1 illustrates an exemplary M2M service architecture 10 using a cellular Access Network (AN) 12. The architecture 10 shows a cellular AN 12 connecting to an M2M Service Provider (SP) network 14. The AN 12 may include a Radio Access Network (RAN) portion (comprising, for example, a base station) of a cellular carrier network, and other portions (e.g., cellular backhaul and core network) as well. Similarly, the terms "M2M Service Provider" or "M2M SP" and "M2M SP network" may be used interchangeably herein to refer to the M2M SP network 14.

Referring to FIG. 1, the cellular AN 12 may include multiple cell sites 16-18, each of which is under the radio coverage of a Base Station (BS) or Base Transceiver Station (BTS) 20-22. Base stations 20-22 may receive wireless signals (via exemplary radio links 23A-23C) from various M2M communication entities 24-32 operating in an M2M device domain 34, and forward the received signals to an M2M core 36 of the cellular network 12. The M2M core 36 may include a cellular backhaul 38 and a cellular Core Network (CN) 40. The backhaul 38 and base stations 20-22 may be considered to comprise the RAN portion of the network 12. The Core Network (CN) 40 may provide logical, service, and control functions (e.g., subscriber account management, billing, subscriber mobility management, etc.), Internet Protocol (IP) connectivity and interconnection to other networks (e.g., the Internet) or entities, roaming support, etc.

In FIG. 1, M2M User 44 (which is also referred to herein as "M2M user device," and may also be referred to as "MTC User" or "D2D User" in certain literature) communicates with the M2M AS 46. The M2M User 44 may be an MTC capable device that can communicate with various M2M communication entities 24-32 and may even (remotely) control or operate them. For example, if an M2M communication entity is a building surveillance sensor or unit, the M2M User 44 in that case may be a remote data collection/processing unit that may instruct the surveillance sensor to transmit surveillance data thereto at predefined time intervals. The combination of M2M AS 46 and the M2M SC 42 may facilitate transfer of relevant application-specific data or other content between the M2M User 44 and respective M2M communication entity/entities.

FIGS. 2~5 illustrate Access Channel (ACH) procedures by a wireless device (e.g., a mobile station). ACH procedure may be used for sending control signaling and short data. ACH procedure is used for various purposes including network access.

Figure 2:
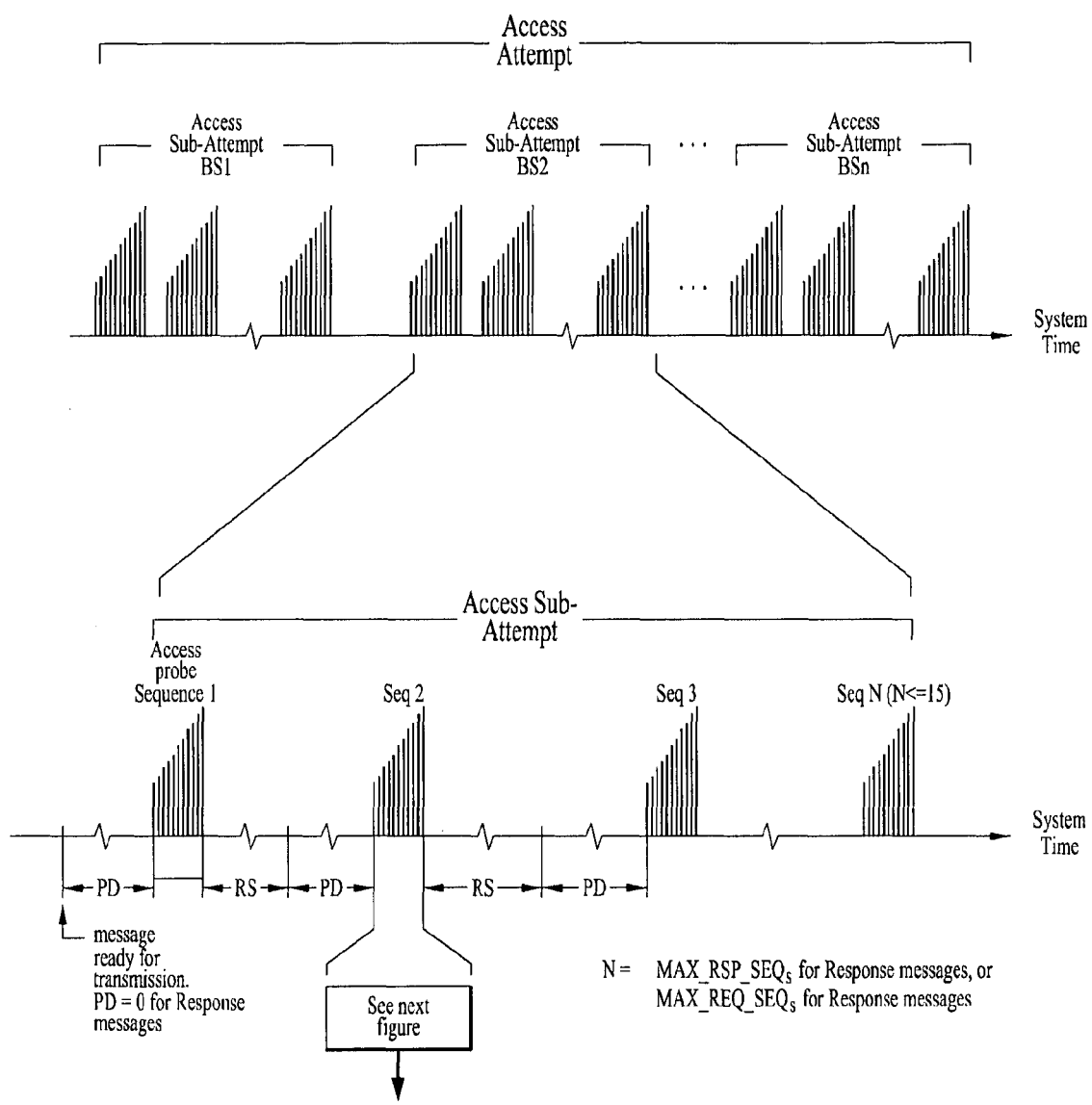
FIGS. 2~3 illustrate an example of access attempt.
Figure 3:
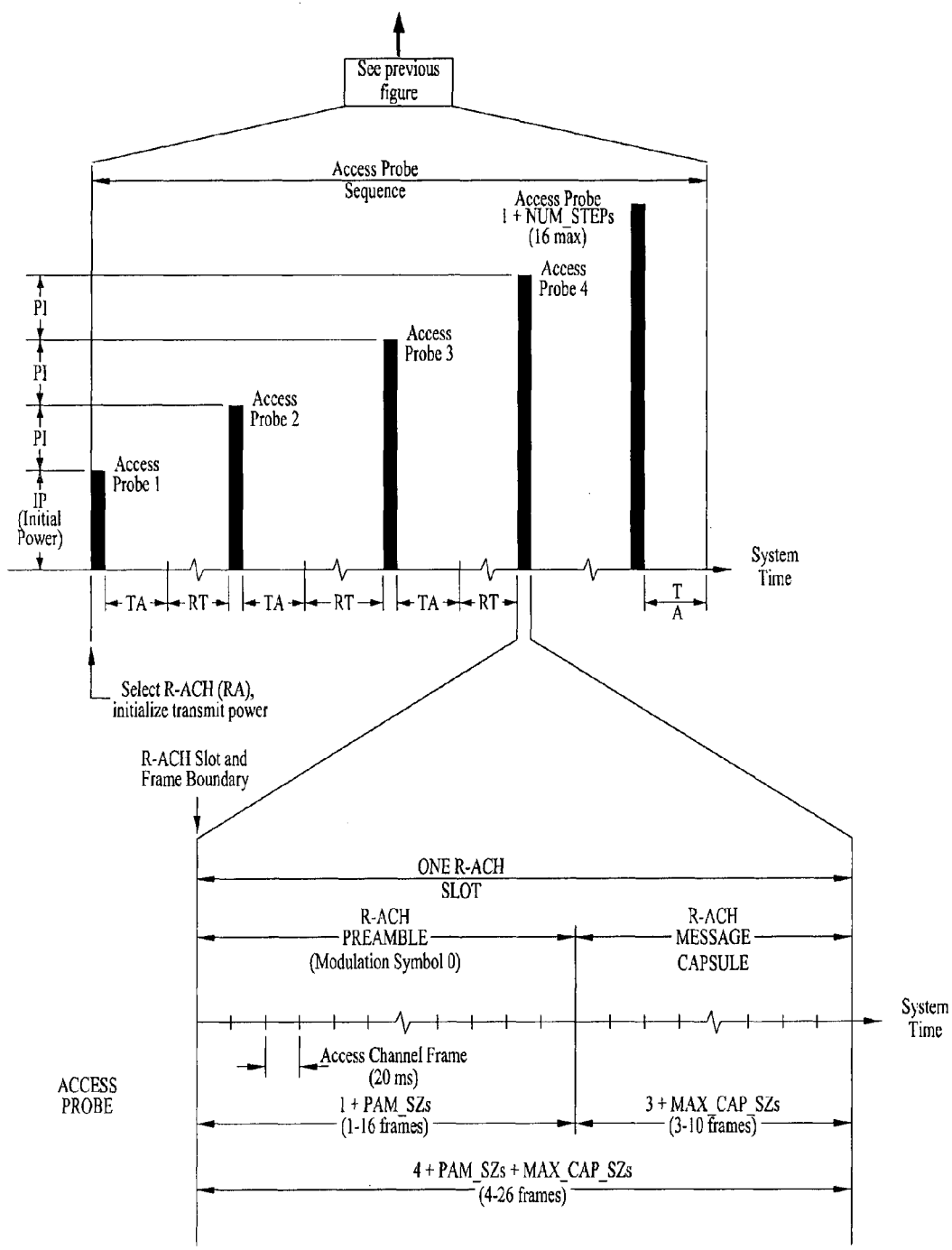

FIGS. 2~3 illustrate an example of access attempt. Access attempt means entire process of sending one Layer 2 encapsulated Protocol Data Unit (PDU) and receiving (or failing to receive) an acknowledgment for the PDU at a mobile station. One access attempt consists of one or more access sub-attempts (FIG. 2). Each transmission in the access sub-attempt is called an access probe (FIG. 3). Each access probe consists of a Reverse Access Channel (R-ACH) preamble and an R-ACH message capsule. In the description, R-ACH is interchangeably used with ACH.

Within an access sub-attempt, access probes are grouped into access probe sequences. The R-ACH used for each access probe sequence is chosen pseudo-randomly from among all the R-ACHs associated with current Forward Paging Channel (F-PCH). If there is only one R-ACH associated with the F-PCH, all access probes within an access probe sequence are transmitted on the same R-ACH. If there is more than one R-ACH associated with the current F-PCH, access probes within an access probe sequence may be transmitted on different R-ACHs associated with the current F-PCH. Each access probe sequence consists of up to 1+NUM_STEPs access probes. The first access probe of each access probe sequence is transmitted at an initial power level determined by a physical layer relative to the nominal open loop power level. Each subsequent access probe within an access probe sequence is transmitted at a power level that is a function of Power Levels (PWR_LVLs), calculated by a Signaling Radio Burst Protocol (SRBP) entity of the mobile station.

Figure 4:
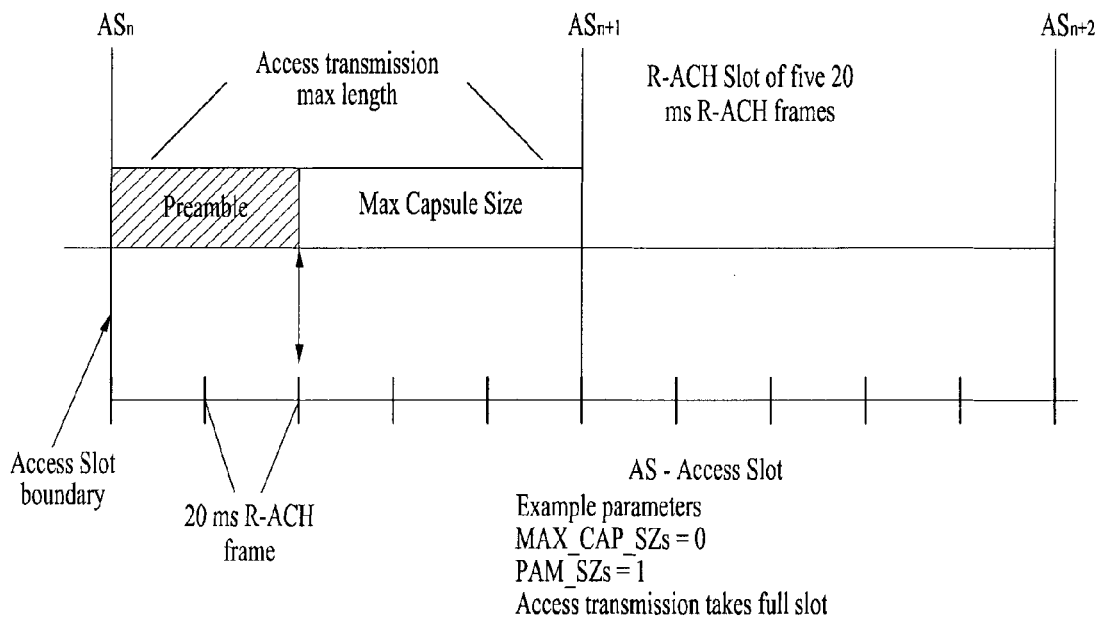
FIG. 4 illustrates an example of R-ACH slot structure.

FIG. 4 illustrates an example of R-ACH slot structure. The timing of access probes and access probe sequences is expressed in terms of 2 R-ACH slots.

Referring to FIG. 4, the transmission of an access probe begins at the start of an R-ACH slot. The timing of the start of each access probe sequence is determined pseudo-randomly. For every access probe sequence, a back-off delay, RS, from 0 to 1+BKOFFs slots is generated pseudo-randomly. In other words, RS means an inter-probe sequence back-off, e.g., delay in slots generated (pseudo-randomly) by the mobile station following an unsuccessful access probe sequence or prior to the first access probe in a response attempt. An additional delay is imposed by the use of a random persistence test that determines the value of the Persistence Delay (PD) based on the parameter P of the MAC-SDUReady.Request primitive.

For each slot after the random back-off delay, RS, the SRBP entity performs a pseudo-random test based on the parameter P of the MAC-SDUReady.Request primitive. If the test passes, the first access probe of the sequence begins in that slot. If the test fails, the access probe sequence is deferred until at least the next slot.

The delay between access probes of an access probe sequence is generated pseudo-randomly. Upon reception of an acknowledgment from the base station, the upper layer terminates the access by no longer sending the MAC-SDUReady.Request primitive.

If a MAC-SDUReady.Request primitive with (seqno mod (NUM_STEPs+1)) not equal to 0 is received:
  If all the access probes within an access probe sequence are transmitted on the same R-ACH associated with the current F-PCH, the next access probe is transmitted after an additional random back-off delay, RT, from 0 to 1+PROBE_BKOFFs slots. In other words, RT means an inter-probe back-off, e.g., delay in slots generated (pseudo-randomly) by the mobile station following an unacknowledged access probe.
  If an R-ACH is pseudo-randomly selected from among all R-ACHs associated with the current F-PCH, the next access probe is transmitted after an additional random back-off delay, RT, from 0 to PROBE_BKOFFs slots.

The precise timing of the Access Channel transmissions in an access attempt is determined by a procedure called Pseudo-random Number (PN) randomization. For each access sub-attempt, the SRBP entity computes a delay, RN, from 0 to $2^{PROBE\_PN\_RANs}-1$ PN chips using a hash function.

Table 1 shows variables that are related to the random access procedures

TABLE 1

| Variable | Name | Generation | Range | Units |
|---|---|---|---|---|
| PD | Persistency Delay | Delay continues slot-by-slot until persistence test (run every slot) passes. | — | slots |
| RA | R-ACH Number | Random between 0 and ACC_CHANs; generated before every access probe sequence or every access probe. | 0 to 31 | — |
| RN | PN Randomization Delay | Hash using RN_HASH_KEYs between 0 and $2^{PROBE\_PN\_RANs}-1$; generated once at the beginning of each access sub-attempt. | 0 to 511 | chips |
| RS | Sequence Back-off | Random between 0 and 1 + BKOFFs; generated before every sequence of an access sub-attempt (except the first sequence). | 0 to 16 | slots |
| RT | Probe Back-off | Random between 0 and 1 + PROBE_BKOFFs; generated before subsequent probes if the mobile station transmits all access probes within an access probe sequence on the same R-ACH. Random between 0 and PROBE_BKOFFs; generated before subsequenct probes if the common channel multiplex sublayer pseudo-randomly selects an R-ACH from among all R-ACHs associated with the current Paging Channel. | 0 to 16 or 0 to 15 | slots |

Figure 5:
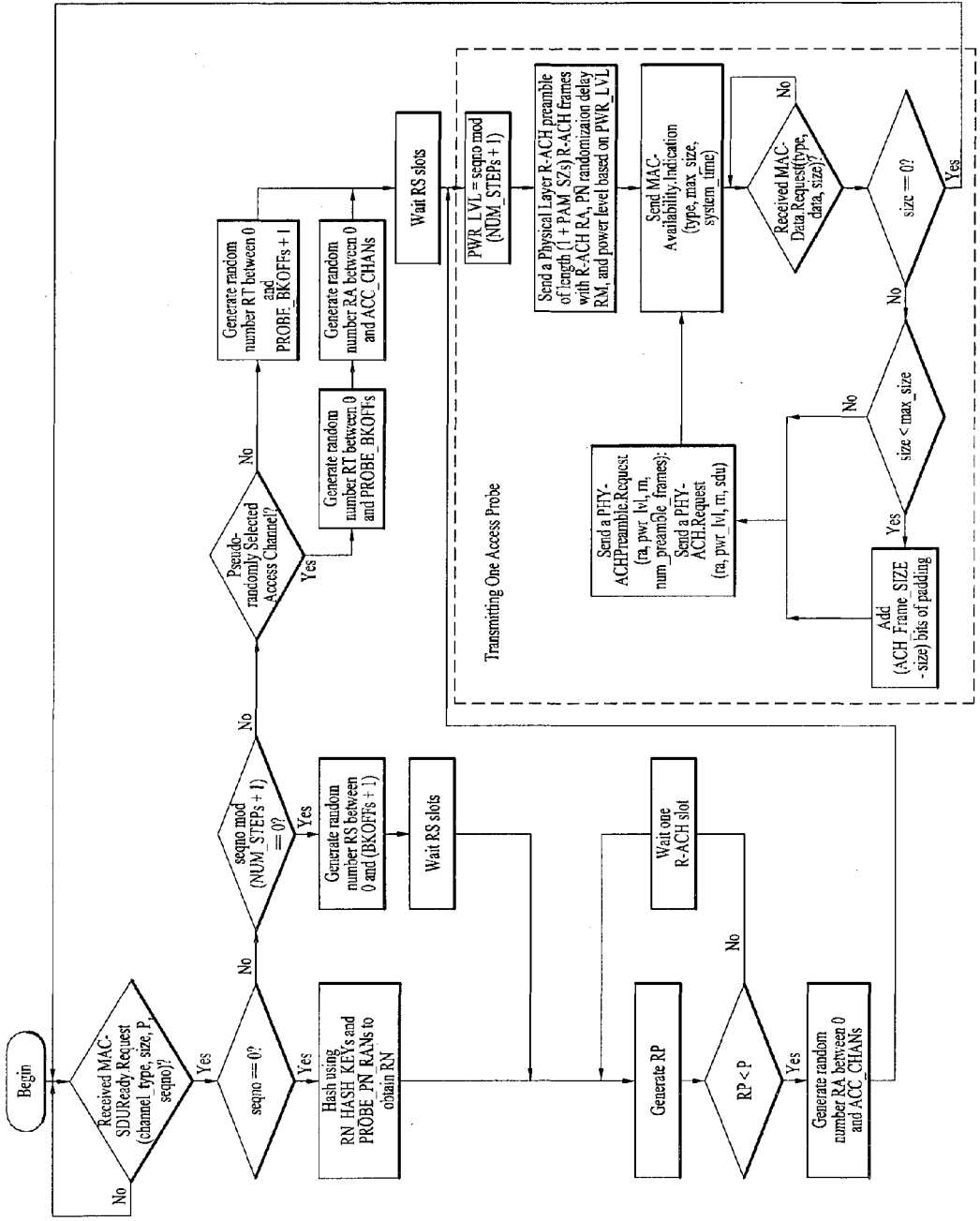
FIG. 5 illustrates an example of random access procedure using R-ACH.

FIG. 5 illustrates an example of random access procedure using R-ACH.

Referring to FIG. 5, upon reception of a MAC-SDU-Ready.Request (channel_type, size, P, seqno) primitive with channel_type set to "ACH frame", the SRBP entity may do the following:

If seqno is equal to 0:
    The SRBP entity sends a MAC-SDUReady.Response (access_mode) primitive with access_mode set to NULL.
    The SRBP entity computes a number, RN, from 0 to $(2^{PROBE\_PN\_RANs}-1)$.
    The SRBP entity performs a persistence test for each R-ACH slot until the test passes. To perform the persistence test, the SRBP entity generates a random number RP, 0<RP<1. The persistence test is said to pass when RP is less than the value of P.
    A common channel multiplex sub-layer generates a random number, RA, from 0 to ACC_CHANs. ACC_CHAN means the number of Access Channels.

If seqno is non-zero and (seqno mod (NUM_STEPs+1)) is equal to 0:
    The SRBP entity generates a random number, RS, from 0 to (BKOFFs+1).
    The SRBP entity waits for RS R-ACH slots and then performs a persistence test for each R-ACH slot until the test passes.
    The common channel multiplex sub-layer generates a random number, RA, from 0 to ACC_CHANs.

If (seqno mod (NUM_STEPs+1)) is non-zero:
    If the common channel multiplex sub-layer transmits all access probes within an access probe sequence on the same R-ACH, the SRBP entity generates a random number, RT, from 0 to 1+PROBE_BKOFFs
    If the common channel multiplex sub-layer pseudo-randomly selects an R-ACH among all the R-ACHs associated with the current F-PCH, the SRBP entity generates a random number, RT, from 0 to PROBE_BKOFFs. If there is more than one R-ACH associated with the current Paging Channel, the common channel multiplex sublayer generates a random number, RA, from 0 to ACC_CHANs.

When transmitting an access probe, the SRBP entity does the following:
    Set PWR_LVLs to (seqno mod (NUM_STEPs+1)).
        The common channel multiplex sub-layer sends a PHY-ACHPreamble.Request (ra, pwr_lvl, rn, num_preamble_frames) primitive to the physical layer with
    ra set to RA;
    pwr_lvl set to PWR_LVLs;
    rn set to RN; and
    num_preamble_frames set to (1+PAM_SZs).

After the transmission of the preamble, the SRBP entity sends a MAC-Availability.Indication primitive and waits for the reception of the matching MAC-Data.Request primitive, for each R-ACH frame, until all the fragments of the Layer 2 encapsulated PDU are transmitted. When sending the MAC-Availability.Indication primitive, the SRBP entity sets max_size to ACH_FRAME_SIZE, and system_time to the System Time at which the frame will be transmitted.

Upon reception of the MAC-Data.Request (channel_type, data, size) primitive with non-zero size and channel_type set to "R-ACH frame", the SRBP entity performs the following:
    The SRBP entity appends (ACH_FRAME_SIZE-size) '0' bits to data to form a Physical Layer R-ACH SDU.

The common channel multiplex sub-layer sends a PHY-ACH.Request (ra, pwr_lvl, rn, sdu) primitive to the Physical Layer with:
    ra set to RA;
    pwr_lvl set to PWR_LVLs;
    rn set to RN; and
    sdu set to the assembled R-ACH SDU.

Besides the ACH procedure of FIGS. 2~5, the access probe can be transmitted as a part of an Enhanced Access Channel (EACH) procedure. The EACH procedure includes basic access mode and reservation access mode, in which the access probe is transmitted via a Reverse Enhanced Access Channel (R-EACH) (basic mode) or a Reverse Common Control Channel (R-CCCH) (reservation access mode). In the description, R-EACH is interchangeably used with EACH. In the basic mode, overall procedure is substantially identical with the ACH procedure, except that enhanced access probe (sequence), R-EACH frame structure and the like are employed instead. Thus, in order to avoid repetitive descriptions, explanations on the basic mode are omitted here and can be referred to explanations of FIGS. 2~5.

The ACH/EACH procedures are performed depending on various access-related parameters. The access-related parameters are broadcast by a base station, by using a message such as an Access Parameters Message (APM), an Enhanced Access Parameters Message (EAPM), a Generic Access Parameters Message (GAPM) and the like.

In particular, access attempts can be performed as follows:
    If the mobile station monitors the Paging Channel, then:
        If base station does not transmit the Generic Access Parameters Message or the mobile station does not support EACH, then the mobile station transmits on the ACH using a random access procedure. Many parameters of the random access procedure are supplied by the base station in the Access Parameters Message.
        If base station does transmit the Generic Access Parameters Message and the mobile station supports EACH, then the mobile station transmits on the EACH using a random access procedure. Many parameters of the random access procedure are supplied by the base station in the Generic Access Parameters Message.
    If the mobile station monitors the Forward Common Control Channel/Primary Broadcast Control Channel, the mobile station transmits on the EACH using a random access procedure. Many parameters of the random access procedure are supplied by the base station in the Enhanced Access Parameters Message.

Before the mobile station transmits an access probe to a new base station on the ACH, the mobile station shall update parameters based on the System Parameters Message, the Access Parameters Message and the Extended System Parameters Message on the associated new Paging Channel and process parameters from the messages Before the mobile station transmits an access probe to a new base station on the EACH, if the mobile station is monitoring Primary Broadcast Control Channel, the mobile station shall update parameters based on the Enhanced Access Parameters Message on the associated new Primary Broadcast Control Channel and process parameters from the messages.

Before the mobile station transmits an access probe to a new base station on the EACH, if the mobile station is monitoring Paging Channel, the mobile station shall update parameters based on the Access Parameters Message, and Generic Access Parameters Message on the associated new Paging Channel.

Table 2 shows a part of Access Parameters Message.

TABLE 2

| Field | Length (bits) |
|---|---|
| PILOT_PN | 9 |
| ... | ... |
| NOM_PWR | 4 |
| INIT_PWR | 5 |
| PWR_STEP | 3 |
| NUM_SEP | 4 |
| ... | ... |
| PSIST(0-9) | 6 |
| PSIST(X) (10 <= X <= 15) | 3 |
| ... | ... |
| PROBE_BKOFF | 4 |
| BKOFF | 4 |
| ... | ... |

PILOT_PN: Pilot PN sequence offset index. The base station may set this field to the pilot PN sequence offset for this base station, in units of 64 PN chips.

NOM_PWR: Nominal transmit power offset. The base station may set this field to the correction factor to be used by a mobile station in the open loop power estimate, expressed as a two's complement value in units of 1 dB INIT_PWR: Initial power offset. The base station may set this field to the correction factor to be used by a mobile station in the open loop power estimate for the initial transmission on an Enhanced Access Channel, expressed as a two's complement value in units of 1 dB.

PWR_STEP: Power increment. The base station shall set this field to the value by which a mobile station is to increase their transmit power between successive access probes in an access probe sequence, in units of 1 dB.

NUM_STEP: Number of access probes. The base station shall set this field to one less than the maximum number of access probes a mobile station is to transmit in a single access probe sequence.

PSIST(0-9): Persistence value for access overload classes 0 through 9. If mobile stations in access overload classes 0 through 9 are permitted to transmit requests on the ACH, the base station may set this field to the persistence value to be used. If such mobile stations are not permitted to transmit requests on the ACH, the base station may set this field to '11111'.

PSIST(X): Persistence value for access overload class X where 10<=X<=15.

PROBE_BKOFF: Access Channel probe back-off range. The base station may set this field to one less than the maximum number of slots a mobile station is to delay due to random back-off between consecutive enhanced access probes.

BKOFF: Access Channel probe sequence back-off range. The base station may set this field to one less than the maximum number of slots a mobile station is to delay due to random back-off between successive enhanced access probe sequences.

Table 3 shows a part of Enhanced Access Parameters Message. Below table mainly shows parameters related with basic access mode. Generic Access Parameters Message has a similar structure to the Enhanced Access Parameters Message.

TABLE 3

| Field | Length (bits) |
|---|---|
| PILOT_PN | 9 |
| ... | ... |
| PSIST_PARMS_INCL | 1 |
| PSIST_PARMS_LEN | 0 or 5 |
| PSIST(0-9)_EACH | 0 or 6 |
| PSIST(X)_EACH (10<=X<=15) | 0 or 3 |
| ... | ... |
| NUM_MODE_PARM_REC | 3 |
| NUM_MODE_PARM_REC + 1 occurrences of the following record: {(NUM_MODE_PARM_REC + 1) | |
| EACH_NOM_PWR | 5 |
| EACH_INIT_PWR | 5 |
| EACH_PWR_STEP | 3 |
| EACH_NUM_STEP | 4 |
| EACH_PREAMBLE_ENABLED | 1 |
| EACH_PREAMBLE_NUM_FRAC | 0 or 4 |
| EACH_PREAMBLE_FRAC_DURATION | 0 or 4 |
| EACH_PREAMBLE_OFF_DURATION | 0 or 4 |
| EACH_PREAMBLE_ADD_DURATION | 0 or 4 |
| RESERVED | 6 |
| EACH_PROBE_BKOFF | 5 |
| EACH_BKOFF | 5 |
| EACH_SLOT | 6 |
| EACH_SLOT_OFFSET1 | 6 |
| EACH_SLOT_OFFSET2 | 6. |
| RERSERVED | 0-7 (as needed) |
| }(NUM_MODE_PARM_REC + 1) | |
| ... | ... |
| NUM_EACH_BA | 5 |
| EACH_BA_RATES_SUPPORTED | 8 |
| ... | ... |

PILOT_PN is same as defined in APM.

PSIST(0-9)_EACH and PSIST(X)_EACH are same as PSIST(0-9) and PSIST(X) but optionally included in accordance with PSIST_PARMS_INCL.

NUM_MODE_PARM_REC: The number of mode-specific parameter records. The base station may set this field to the number of mode-specific parameter records included in the message, minus one. The mode includes a basic access mode and a reservation access mode.

EACH_NOM_PWR, EACH_INIT_PWR, EACH_PWR_STEP and EACH_NUM_STEP are same as NUM_PWR, INIT_PWR, PWR_STEP and NUM_STEP except that these fields are used for the Enhanced Access Channel.

EACH_PROBE_BKOFF and EACH_BKOFF are same as PROBE_BKOFF and BKOFF, except that these fields are used for the Enhanced Access Channel.

EACH_PREAMBLE_ENABLED: Preamble enabled indicator for the Enhanced Access Channel. The base station shall set this field to '1' if EACH preambles related information is included; otherwise, the base station may set this field to '0'.

EACH_PREAMBLE_NUM_FRAC: The number of fractional preambles on the Enhanced Access Channels. If EACH_PREAMBLE_ENABLED is set to '1', the base station may set this field to the number of fractional preambles minus one on the Enhanced Access Channels; otherwise, the base station may omit this field.

EACH_PREAMBLE_FRAC_DURATION: Fractional preamble duration on the Enhanced Access Channels. If EACH_PREAMBLE_ENABLED is set to '1', the base station may set this field to the fractional preamble duration minus one on an Enhanced Access Channel, in units of 1.25 ms; otherwise, the base station may omit this field.

EACH_PREAMBLE_OFF_DURATION: Fractional preamble gated-off duration on the Enhanced Access Channels. If EACH_PREAMBLE_ENABLED is set to '1', the base station may set this field to the fractional preamble gated-off duration (in units of 1.25 ms) after the transmission of each fractional preamble on an Enhanced Access Channel; otherwise, the base station shall omit this field.

EACH_PREAMBLE_ADD_DURATION: Additional preamble duration on the Enhanced Access Channels. If EACH_PREAMBLE_ENABLED is set to '1', the base station may set this field to the additional preamble duration on an Enhanced Access Channel, in units of 1.25 ms; otherwise, the base station may omit this field.

EACH_SLOT: Slot duration for the Enhanced Access Channels. The base station may set this field to N where the slot duration of the Enhanced Access Channel is (N+1)*1.25 ms. The base station may set this field to a value between 0 and 63.

EACH_SLOT_OFFSET1: First slot offset for the Enhanced Access Channels. The base station may set this field so that the Enhanced Access Channel has a slot offset equal to (EACH_ID*EACH_SLOT_OFFSET2+EACH_SLOT_OFFSET1) mod (EACH_SLOT+1), where EACH_ID is the Enhanced Access Channel Index. The base station may set this field to a value between 0 and 63, in units of 1.25 ms.

EACH_SLOT_OFFSET2: Relative slot offset for the Enhanced Access Channels. The base station may set this field so that the Enhanced Access Channel has a slot offset equal to (EACH_ID*EACH_SLOT_OFFSET2+EACH_SLOT_OFFSET1) mod (EACH_SLOT+1), where EACH_ID is the Enhanced Access Channel Index. The base station may set this field to a value between 0 and 63, in units of 1.25 ms.

NUM_EACH_BA: Number of Enhanced Access Channels used for the Basic Access Mode. The base station may set it to the number of Enhanced Access channels used for the Basic Access mode minus one.

NUM_BA_RATES_SUPPORTED: Supported rate words for the Basic Access mode on the Enhanced Access Channels. The base station may set each subfield of the EACH_BA_RATES_SUPPORTED field as follows: the base station may set the subfield to '1' if the corresponding mode in Table 4 is allowed; otherwise the base station may set the subfield to '0'.

TABLE 4

EACH and R-CCCH Data Rate and Frame Size

| Subfield | Length (bits) | Subfield Description |
|---|---|---|
| RATE_SIZE_1 | 1 | 9600 bps, 20 ms frame size |
| RATE_SIZE_2 | 1 | 19200 bps, 20 ms frame size |
| RATE_SIZE_3 | 1 | 19200 bps, 10 ms frame size |
| RATE_SIZE_4 | 1 | 38400 bps, 20 ms frame size |
| RATE_SIZE_5 | 1 | 38400 bps, 10 ms frame size |
| RATE_SIZE_6 | 1 | 38400 bps, 5 ms frame size |
| RESERVED | 2 | Reserved |

Example

In the conventional random access procedures, access parameters are defined for normal mobile station, which means non-M2M mobile station in the description. And, in conventional random access procedures, congestion is controlled in accordance with a persistence test using a persistence probability value. The persistence probability value is signaled through PSIST fields in APM, EAPM and the like.

As a result, Access Parameters other than the persistence probability cannot be customized during congestion. This does not matter since normal mobile stations cause network access congestion under a controllable extent even though only the persistence probability is employed. However, for M2M mobile stations in cdma2000 and other systems, possible enormous number of M2M mobile stations being involved in congestion may lead to serious problems. For example, access attempts from normal mobile stations can be blocked due to large number of M2M mobile stations being involved in congestion. This kind of situation will be aggravated when more M2M mobile stations try to access a network system, e.g., in an emergency situation. That is, for a M2M situation, mere control of persistence probability can increase the number of the backlogged M2M mobile stations that have not received permissions to access the network system.

It is thus desirable to devise a mechanism that distributes M2M mobile stations in access attempts (preferably, in addition to the control of persistence probability), thus maintaining the reasonable numbers of M2M mobile stations successfully accommodated in the network system. For this end, the present invention proposes to provide, in a message that carries access-related parameter(s), an optional separate section of at least one field which conveys at least one access parameter which is not persistence probability, to be used by the M2M mobile stations for access. Inclusion of such parameter(s) may be indicated by a flag, which signals whether system is under congestion or not. For example, when the proposed flag is "ON", M2M mobile stations will use proposed access parameter(s) designed for congestion. Otherwise, M2M mobile stations will use only the conventional access parameter(s), as exemplified in Tables 1~4.

The proposed access parameter(s) may be included in a newly defined message or a conventional message. For example, the conventional message may include an Access Parameters Message (APM), an Enhanced Access Parameters Message (EAPM), a Generic Access Parameters Message (GAPM), etc. And, even though not limited to this, for example, the proposed access parameter(s) may include at least one of an extended PROBE_BKOFF and an extended BKOFF. As mentioned above, in the conventional random access procedure, two kinds of random back-offs are applied, i.e., an inter-probe sequence back-off and an inter-probe back-off. The inter-probe sequence back-off means a delay in slots generated (pseudo-randomly) following an unsuccessful access probe sequence or prior to the first access probe in a response attempt. The delay for the inter-probe sequence back-off has a value from 0 to 1+BKOFFs. The inter-probe back-off means a delay in slots generated (pseudo-randomly) by the mobile station following an unacknowledged access probe. The delay for inter-probe back-off has a value from 0 to 1+PROBE_BKOFFs. BKOFF is signaled via an N-bit BKOFF field or an N-bit BKOFF EACH field, and PROBE_BKOFF is signaled via an N-bit PROBE_BKOFF field or an N-bit PROBE_BKOFF EACH field. N is a positive integer, preferably 4. Thus, for example, by employing at least one of additional M1-bit BKOFF (or M1-bit BKOFF EACH) field/value and additional M2-bit PROBE_BKOFF (or M2-bit PROBE_BKOFF EACH) field/value, it is possible to distributes M2M mobile stations in access attempts (preferably, in addition to the control of persistence probability). M1 and M2 are positive integers larger than N. M1 and M2 may be defined independently or defined as M1=M2. For example, M1 may be 5 and M2 may be 5. It is also possible to signal access-related parameter(s) other than random back-off related parameter for distributing M2M mobile stations in access attempts (preferably, in addition to the control of persistence probability).

Figure 6:
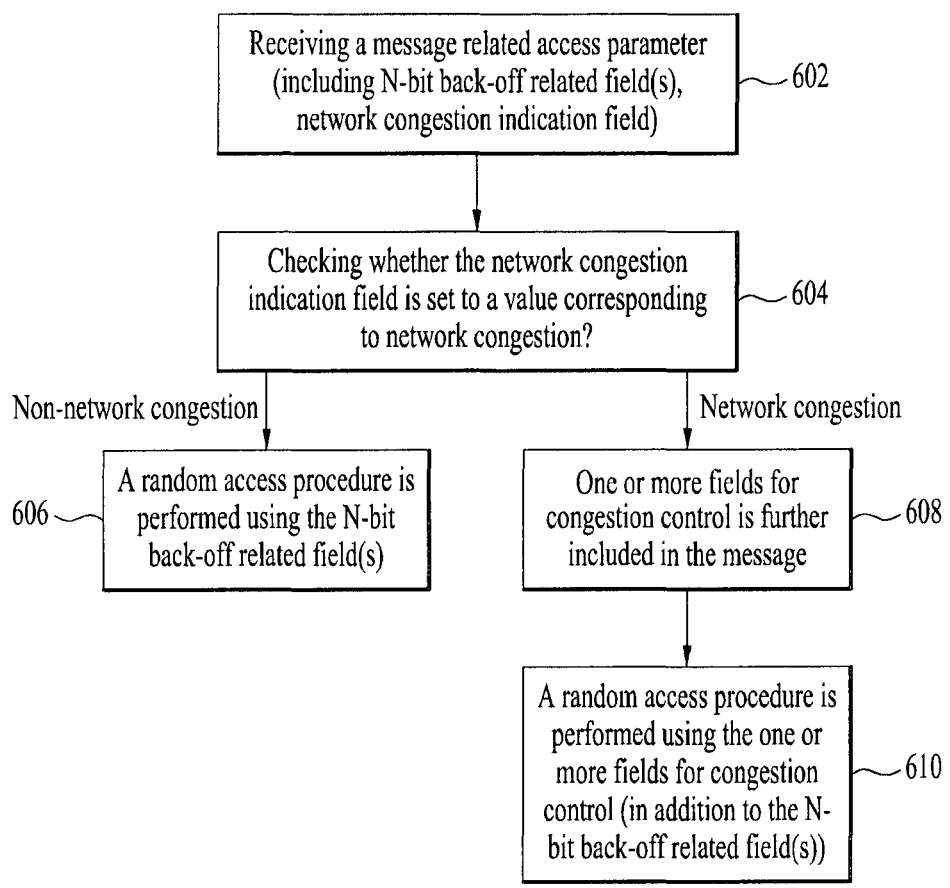
FIG. 6 illustrates an example of random access procedure for M2M wireless device (e.g., M2M mobile station) in accordance with the present invention.

FIG. 6 illustrates an example of random access procedure for M2M device (e.g., M2M mobile station) in accordance with the present invention. It is assumed that the random access procedure for M2M mobile station can be performed using any one of ACH procedure or EACH procedure. When the EACH procedure is used, it is also assumed that basic access mode of the EACH procedure is used for M2M mobile station.

Referring to FIG. 6, an M2M mobile station receives one or more messages related access parameter (602). The one or more messages may include one or more N-bit back-off related fields (e.g., BKOFF, PROBE_BKOFF), network congestion indication field. N is a positive integer, preferably 4. The one or more messages may include an Access Parameters Message, an Enhanced Access Parameters Message, a Generic Access Parameters Message and the like. For the step 602, a base station continually monitors each active Access Channel or Enhanced Access Channel or both. The base station provides control information in cases of overload, by using Access Parameters Message, Generic Access Parameters Message or the Enhanced Access Parameters Message.

Then, the M2M mobile station checks whether the network congestion indication field is set to a value corresponding to network congestion or not (604). The network congestion indication field may be 1-bit field indicating congestion/non-congestion (or inclusion/non-inclusion of proposed access-related parameters). The network congestion indication field may be P (P>1)-bit field. In this case, P-bit field is able to indicate congestion extent(s) as well, and information on the congestion extent(s) can be used to modify the access-related parameters for M2M mobile station. For example, one or more values of the P-bits field may be used as a weighting value for proposed parameters.

If non-network congestion is identified from the network congestion indication field, the M2M mobile station performs a random access procedure using the one or more N-bit back-off related fields (606). Meanwhile, if network congestion is identified from the network congestion indication field, one or more fields for congestion control can be further included in the message (608). For example, the one or more fields for congestion include at least one of M1-bit information for inter-probe sequence back-off and M2-bit information for inter-probe back-off. M1 and M2 are positive integers larger than N. M1 and M2 may be defined independently or defined as M1=M2. For example, M1 may be 5 and M2 may be 5. Then, if necessary, the M2M mobile station performs a random access procedure using the one or more fields for congestion control (in addition to the N-bit back-off related field(s)) (610).

Table 5 shows an example structure of the message in FIG. 6. Table 5 may be a part of the Enhanced Access Parameters Message or the Generic Access Parameters Message. The Access Parameter Message can be used in a similar way.

TABLE 5

| Field | Length (bits) |
|---|---|
| PILOT_PN | 9 |
| . . . | . . . |
| EACH_PROBE_BKOFF | 4 |
| EACH_BKOFF | 4 |
| . . . | . . . |
| CONGESTION$^{(C)}$ | 1 |

If the value of the CONGESTION$^{(C)}$ field indicates network congestion (e.g., the CONGESTION$^{(C)}$ field is set to 1), at least one field of the following record is included:

| Field (Congestion control parameter) | Length (bits) |
|---|---|
| EACH_NOM_PWR$^{(C)}$ | 5 |
| EACH_INIT_PWR$^{(C)}$ | 5 |
| EACH_PWR_STEP$^{(C)}$ | 3 |
| EACH_NUM_STEP$^{(C)}$ | 4 |
| EACH_PREAMBLE_ENABLED$^{(C)}$ | 1 |
| EACH_PREAMBLE_NUM_FRAC$^{(C)}$ | 0 or 4 |
| EACH_PREAMBLE_FRAC_DURATION$^{(C)}$ | 0 or 4 |
| EACH_PREAMBLE_OFF_DURATION$^{(C)}$ | 0 or 4 |
| EACH_PREAMBLE_ADD_DURATION$^{(C)}$ | 0 or 4 |
| EACH_PROBE_BKOFF$^{(C)}$ | 5 |
| EACH_BKOFF$^{(C)}$ | 5 |
| EACH_SLOT$^{(C)}$ | 6 |
| EACH_SLOT_OFFSET1$^{(C)}$ | 6 |
| EACH_SLOT_OFFSET2$^{(C)}$ | 6. |
| NUM_EACH_BA$^{(C)}$ | 5 |
| EACH_BA_RATES_SUPPORTED$^{(C)}$ | 8 |

The superscript (c) means newly included access-related parameters for network congestion control in accordance with the present invention. Descriptions of the above fields are substantially identical with descriptions in Tables 3 and 4. Only, for network congestion control, the proposed access-related parameter(s) can be additionally included in the message, and the base station may set the proposed access-related parameter(s) independently in consideration of congestion situations/extents. It is also noted that, in the proposed access-related parameters, EACH_PROBE_BKOFF$^{(C)}$ has 5-bit information and EACH_BKOFF$^{(C)}$ has 5-bit information, whereby M2M mobile stations can be distributed in access attempts (preferably, in addition to the control of persistence probability).

EACH_PROBE_BKOFF$^{(C)}$: Enhanced Access Channel probe back-off range for congestion control. The base station may set this field to one less than the maximum number of slots a mobile station is to delay due to random back-off between consecutive enhanced access probes.

EACH_BKOFF$^{(C)}$: Enhanced Access Channel probe sequence back-off range for congestion control. The base station may set this field to one less than the maximum number of slots a mobile station is to delay due to random back-off between successive enhanced access probe sequences.

Table 6 shows an example structure of the message in FIG. 6. Table 6 may be a part of the Enhanced Access Parameters Message or the Generic Access Parameters Message. The Access Parameter Message can be used in a similar way.

TABLE 6

| Field | Length (bits) |
|---|---|
| PILOT_PN | 9 |
| . . . | . . . |
| EACH_NOM_PWR | 5 |
| EACH_INIT_PWR | 5 |
| EACH_PWR_STEP | 3 |
| EACH_NUM_STEP | 4 |
| EACH_PREAMBLE_ENABLED | 1 |
| EACH_PREAMBLE_NUM_FRAC | 0 or 4 |
| EACH_PREAMBLE_FRAC_DURATION | 0 or 4 |
| EACH_PREAMBLE_OFF_DURATION | 0 or 4 |
| EACH_PREAMBLE_ADD_DURATION | 0 or 4 |
| . . . | . . . |

TABLE 6-continued

| | |
|---|---|
| EACH_PROBE_BKOFF | 4 |
| EACH_BKOFF | 4 |
| ... | ... |
| CONGESTION$^{(C)}$ | 1 |
| CONGESTION$^{(C)}$ + 1 occurrence(s) for the following record: {(CONGESTION$^{(C)}$ + 1) | |

| Field (Congestion control parameter) | Length (bits) |
|---|---|
| EACH_PARM_REC_LEN$^{(C)}$ | 3 |
| RESERVED | variable |
| EACH_PROBE_BKOFF$^{(C)}$ | 5 |
| EACH_BKOFF$^{(C)}$ | 5 |
| }(CONGESTION$^{(C)}$ + 1) | |
| EACH_SLOT | 6 |
| EACH_SLOT_OFFSET1 | 6 |
| EACH_SLOT_OFFSET2 | 6. |
| NUM_EACH_BA | 5 |
| EACH_BA_RATES_SUPPORTED | 8 |

The superscript (c) means newly included access-related parameters for network congestion control in accordance with the present invention. Descriptions of the above fields are substantially identical with descriptions in Tables 3 and 4.

CONGESTION$^{(C)}$: The number of access-overload-class-specific parameter records. The base station may set this field to the number of access-overload-class-specific parameter records included in the message, minus one.

EACH_PARM_REC_LEN$^{(C)}$: Length of the access-overload-class-specific parameters record.

RESERVED$^{(C)}$: Reserved bits. The base station shall set this field to '000000'.

EACH_PROBE_BKOFF$^{(C)}$: Enhanced Access Channel probe back-off range for congestion control. The base station may set this field to one less than the maximum number of slots a mobile station is to delay due to random back-off between consecutive enhanced access probes. The base station may not set this field to a value more than '01111' for access overload classes other than 14.

EACH_BKOFF$^{(C)}$: Enhanced Access Channel probe sequence back-off range for congestion control. The base station may set this field to one less than the maximum number of slots a mobile station is to delay due to random back-off between successive enhanced access probe sequences. The base station may not set this field to a value more than '01111' for access overload classes other than 14.

FIG. 6 and Tables 5~6 show examples that the conventional one or more N-bit back-off related fields and the proposed access-related parameters are transmitted/received using the same message. However, the conventional one or more N-bit back-off related fields and the proposed access-related parameters can be transmitted/received using different messages. For example, the conventional one or more N-bit back-off related fields are transmitted/received using the Access Parameters Message, but the proposed access-related parameters are transmitted/received using the Enhanced Access Parameters Message or the Generic Access Parameters Message.

Figure 7:
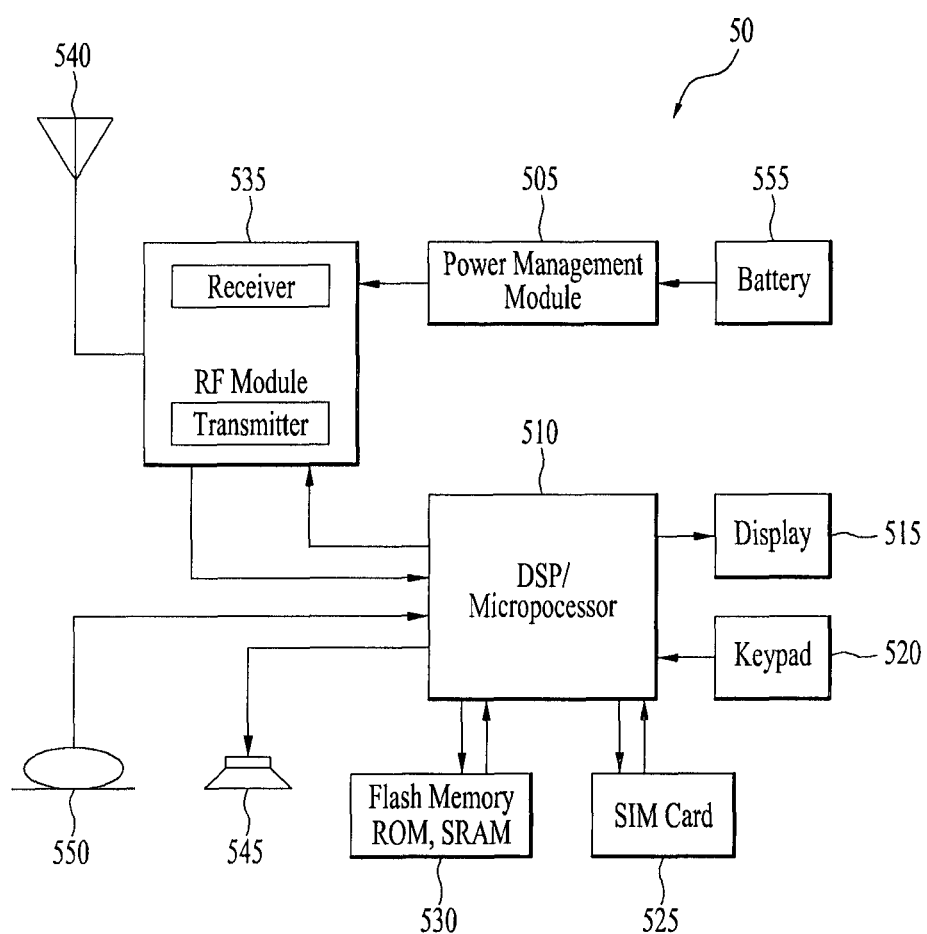
FIG. 7 illustrates a block diagram of a wireless device 10.

FIG. 7 illustrates a block diagram of a wireless device 50. The wireless device 50 includes a M2M device or a delay-tolerant device. The wireless device 50 includes a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF module 535, to initiate communication, for example, transmits radio signals comprising voice communication data. The RF module 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example. The processor 510 also includes the protocols and functions necessary to perform the various processes described herein.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS and a wireless device. A specific operation which has been described as being performed by the eNB (or BS) may be performed by an upper node of the BS as the case may be. In other words, it will be apparent that various operations performed for communication with the wireless device in the network which includes a plurality of network nodes along with the BS can be performed by the BS or network nodes other than the BS. The BS may be replaced with terms such as fixed station, Node B, eNode B (eNB), and access point. Also, the term wireless device may be replaced with terms such as mobile station (MS), mobile subscriber station (MSS), M2M device, M2M MS, MTC device, MTC MS, D2D device, D2D MS, a delay-tolerant device, a delay-tolerant MS and a user equipment (UE).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be used for a method, a wireless device, a base station, a relay in a wireless communication system.

The invention claimed is:

1. A method of controlling network access at a wireless device in a wireless communication system, the method comprising:

receiving a message related with access parameters, the message including a first 1 bit field for indicating a network congestion situation;

checking whether the first 1-bit field is set to a value corresponding to network congestion, wherein if the first 1-bit field is set to the value corresponding to network congestion, the message further includes a second field for slot duration; and performing a random access procedure using the second field for slot duration, if the first 1-bit field is set to the value corresponding to network congestion, wherein the second field is set to N which is a value between 0 and 63, and wherein the slot duration of a random access channel is set to (N+1)*1.25 ms.

2. A wireless device for use in a wireless communication system, the wireless device comprising:

a radio frequency unit; and a processor, wherein the processor is configured:

to receive a message related with access parameters, the message including a first 1 bit field for indicating a network congestion situation;

to check whether the first 1-bit field is set to a value corresponding to network congestion, wherein if the first 1-bit field is set to the value corresponding to network congestion, the message further includes a second field for slot duration; and to perform a random access procedure using the second field for slot duration, if the first 1-bit field is set to the value corresponding to network congestion, wherein the second field is set to N which is a value between 0 and 63, and wherein the slot duration of a random access channel is set to (N+1)*1.25 ms.

* * * * *